Figure 4:
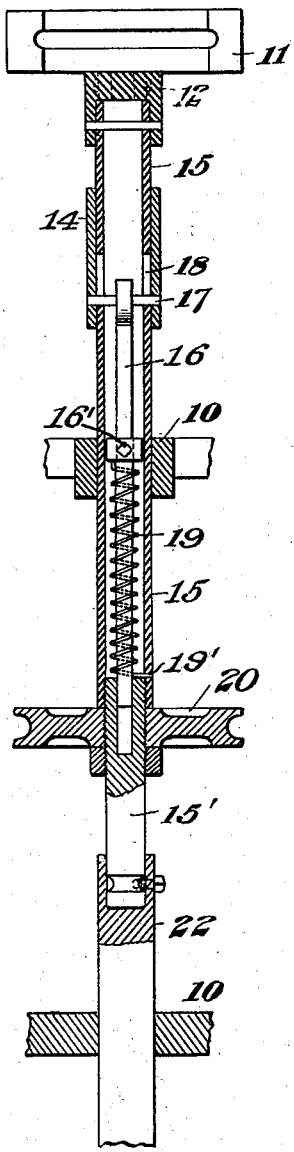

No. 746,498. PATENTED DEC. 8, 1903.
A. R. GROTZ.
APPARATUS FOR FIRE FINISHING ARTICLES OF GLASSWARE.
APPLICATION FILED AUG. 4, 1900.
NO MODEL. 2 SHEETS—SHEET 1.
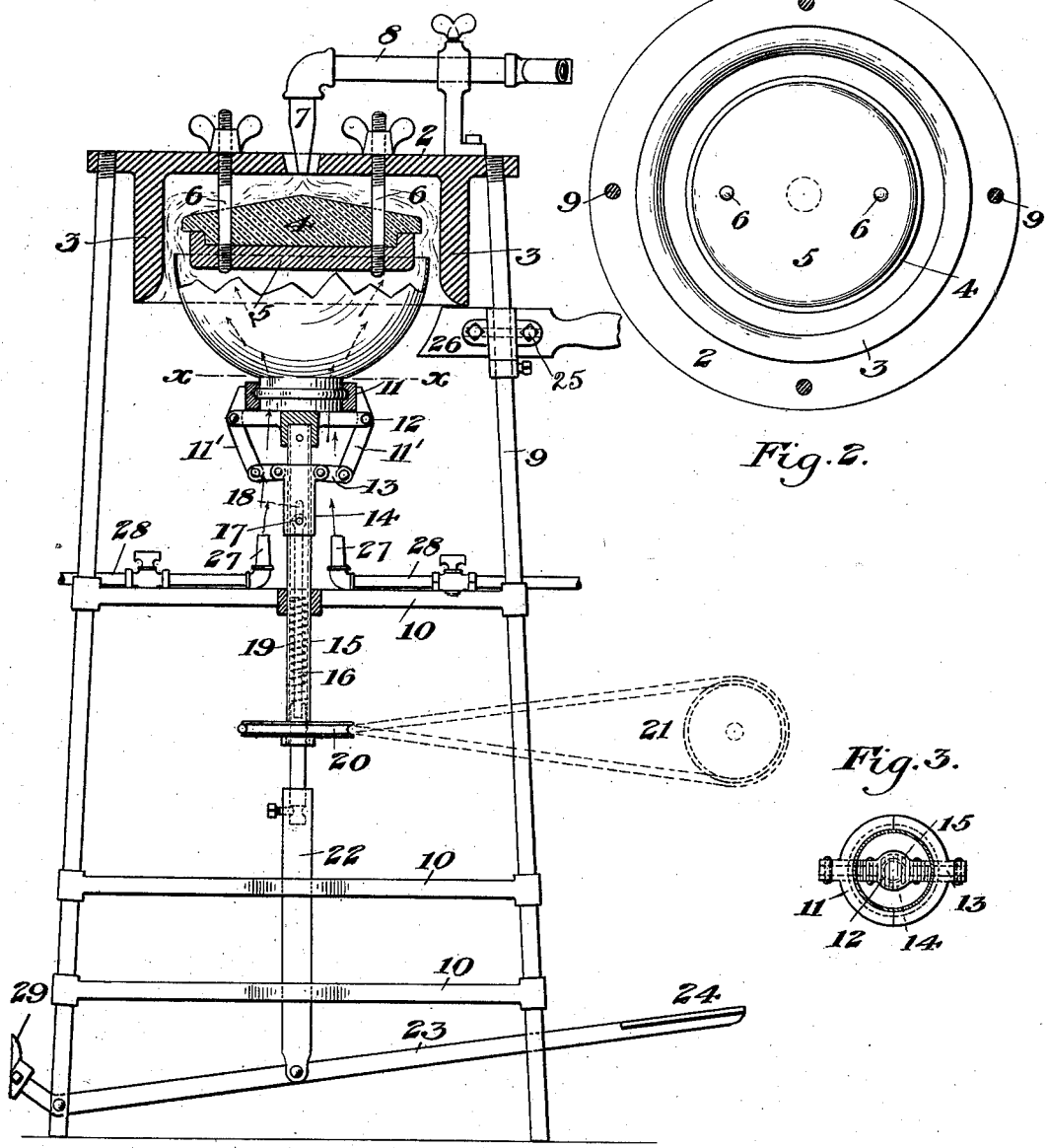
WITNESSES
INVENTOR
Albert R Grotz No. 746,498. PATENTED DEC. 8, 1903.
A. R. GROTZ.
APPARATUS FOR FIRE FINISHING ARTICLES OF GLASSWARE.
APPLICATION FILED AUG. 4, 1900.
NO MODEL. 2 SHEETS—SHEET 2.

No. 746,498. Patented December 8, 1903.

UNITED STATES PATENT OFFICE.

ALBERT R. GROTZ, OF WELLSBURG, WEST VIRGINIA.

APPARATUS FOR FIRE-FINISHING ARTICLES OF GLASSWARE.

SPECIFICATION forming part of Letters Patent No. 746,498, dated December 8, 1903.

Application filed August 4, 1900. Serial No. 25,889. (No model.)

*To all whom it may concern:*

Be it known that I, ALBERT R. GROTZ, of Wellsburg, in the county of Brooke and State of West Virginia, have invented a new and useful Improvement in Apparatus for Fire-Finishing Articles of Glassware, of which the following is a full, clear, and exact description, reference being had to the accompanying drawings, forming part of this specification, in which—

Figure 1 is a side elevation of my improved apparatus. Fig. 2 is a plan view of the lower face of the deflector, and Fig. 3 is a cross-section on the line $x\,x$ of Fig. 1. Fig. 4 shows a vertical section of the snap and shaft supporting the snap on a larger scale than Fig. 1.

In the manufacture of articles of glassware by blowing, known as "blown glassware," it is customary to separate the article from the piece of glass which has been connected with the blowpipe, to grind the edge, and to finish or glaze the same by subjecting the ground edge to heat sufficient to melt or glaze the same, and where articles of glassware are formed in a mold it is customary to subject the article, after it has been taken from the mold, to sufficient heat to glaze the surface or parts of the same to remove mold-marks and to impart luster to the glass. It is necessary in this melting or glazing operation that the heat shall be sufficient to melt the cracked off and ground edge of the glass article, and yet shall be so confined and regulated as not to soften and distort the body of the article to be glazed.

The object of my invention is to provide a glory-hole and heating-chamber and apparatus for presenting the article of glass to the same and for rotating the glass article within the zone of heat, as is hereinafter described.

In the drawings I have shown my improved apparatus as particularly adapted to fire-finishing the edges of lamp-shades, although I do not desire to limit myself to this use, as it may be adapted to finish other articles of glassware by making the parts of proper shape and size.

The glory-hole or heating-furnace is composed of a top plate 2, formed of suitable material. Extending downwardly from the plate 2 is the outer annular flange 3, forming a hood within which, yet separated therefrom, is the deflector 4, which is composed, preferably, of an upper part, formed of fire-clay, and a lower metal plate 5, which supports the fire-clay part and is itself so supported by adjustable screw-bolts 6 that the deflector shall be held a certain distance away from the upper plate 2. By this construction a fire-chamber is formed above the deflector 4 and between the same and the annular flange 3. Projecting through the plate 2 is a gas-burner nozzle 7, which is fitted on the end of the gas and air pipe 8.

The plate or cover 2 is supported by suitable standards 9, having cross-pieces 10, forming a stand, which supports the snap punty or holder for holding the lamp-shade or other glass article to the glory-hole. The jaws 11 of this snap may be of any size or form adapted to grasp a part of the glass article to be fire-finished. In the drawings they are shown of proper shape to grasp the smaller end of the shade and to so hold it in an inverted position that the ground edge of the shade shall fit within the hood 3 around and outside of the deflector 4. The snap itself is composed of the segmental jaws 11, which are pivoted to the cross-bar 12 and by means of extensions 11' to the toggle-arms 13, which are in turn pivoted to the sliding sleeve 14, which fits around the vertical hollow shaft 15, to the upper end of which the cross-bar 12 is secured. Within the hollow shaft 15 is the rod 16, having an eye at its upper end, through which extends a pin 17, which passes through the short vertical slot 18 in the shaft 15 and is attached to the sliding sleeve 14. Around the rod 16 is placed a coiled spring 19, secured to the rod by a suitable collar 16' and at its other end to the hollow shaft 15, as at 19', or some part rigidly connected thereto. To the lower end of the hollow shaft 15 is secured a shaft 15', the upper end of which acts as a guide for the lower end of the rod 16. The rod 16 by reason of the contractile tendency of the spring 19 is drawn downwardly when the sleeve 14 is out of engagement with the cross-bar 10, so that the pin 17 is at the lower end of the slot 18, as shown in Fig. 1, and the snap 11 holds the article firmly. At the lower end of the shaft 15 is the belt-wheel 20, by means of which a rotatory movement is imparted to the shaft and to the snap which is supported thereby, power being communicated from the power-wheel 21. This belt-wheel and the shaft 15' are journaled in the end of a non-rotatable rod 22, which is loosely connected at its lower end with the arm 23 of a treadle 24, the arm 23 and treadle 24, together with the shafts supporting the snap and article, being more than counterbalanced by a counterweight 29, so that normally the parts are in an elevated position. By means of the treadle the snap may be vertically raised or lowered to bring the edge of the shade within and without the zone of heat of the glory-hole.

Secured to a suitable bracket 25 on the standard 9 is the sliding former 26, the curved forming end of which may be pushed against the outer face of the edge of the glass shade as it rotates with the snap when the snap is in a lowered position, whereby any flaring of the edge of the shade from the action of the heat may be remedied.

Below the snap 11 are air-nozzles 27, leading from air-pipes 28. These nozzles force air up against the lower portion of the glass shade and into the interior of the shade, where it serves the additional purpose of supporting combustion about the rim of the deflector.

The operation is as follows: The gas issuing from the nozzle 7 being ignited, combustion takes place above and around the deflector 4, which heats the same to a high temperature. The operator then depresses the treadle 24, which, through its extension 23, lowers the rod 22, the shaft 15' connected to the rod, the shaft 15 connected to the shaft 15', and the cross-bar 12 of the snap attached to the shaft 15. The spring 19 being connected to the shaft 15, downward motion of the latter communicates a downward motion to the spring, and consequently to the rod 16, to which the spring is also connected. The downward movement of the rod is transmitted to the sliding sleeve 14 by the pin 17. This downward movement of the sleeve continues until the bottom of the sleeve contacts with the cross-brace 10. Further downward movement of the shaft 15 is permitted by reason of the slot 18 in said shaft. This further movement of the shaft 15 pulls down on the head 12, which causes the jaws 11 of the snap attached thereto to open. The glass shade or other article to be fire-finished is then placed in an inverted position on the head 12 between said jaws. The operator then removes his foot from the treadle 24, when the counterweight 29 will raise the parts to their elevated position, bringing the upper edge of the shade within the zone of heat inside the hood. The shade is rotated within the hood until the edge is softened when by a downward movement of the treadle the edge of the shade is lowered to the level of the former 26, which is brought forward against the periphery of the rotating shade to true the same. By a further downward movement of the treadle, as just described, the snap is opened to permit of the removal of the shade.

The advantages of my invention will be apparent to those skilled in the art. Owing to the position of the deflector 4 the heat is directed and radiated evenly against all parts of the edge of the shade or other article and breakage and uneven and imperfect glazing is greatly lessened.

I do not limit myself to the particular form of the parts shown and described, nor do I desire to limit myself to the particular form of snap which I have described.

I claim—

1. In apparatus for fire-finishing articles of glassware, a snap for grasping and holding the article to be finished, mechanism for imparting to the snap a downward movement, mechanism for opening the snap during the latter part of said downward movement, mechanism for returning the snap to its uppermost position, and mechanism for rotating the snap; substantially as described.

2. In apparatus for fire-finishing articles of glassware, a glory-hole having a deflector, a rotatory snap for grasping and holding the article to be finished, and air-nozzles for projecting air against the article; substantially as described.

3. In apparatus for fire-finishing articles of glassware, a glory-hole, a former situate below said glory-hole, a snap for grasping and holding the article to be finished and presenting the same to the glory-hole, mechanism for rotating the snap, mechanism for lowering the snap and the portion of the article to be operated on by the former to the level of the former, and mechanism for opening the snap on the further downward movement thereof substantially as described.

4. In apparatus for finishing articles of glassware, a snap for grasping and holding the article to be finished, a rotatory shaft on which said snap is mounted, a sleeve slidable on said shaft, arms attached to the jaws of the snap, links connecting said arms and said sleeve, mechanism for moving said shaft and said sleeve downwardly, and mechanism for arresting the downward movement of the sleeve before the downward movement of the shaft has ceased, whereby the jaws of the snap are opened for the insertion or removal of the article.

In testimony whereof I have hereunto set my hand.

ALBERT R. GROTZ.

Witnesses:
S. R. CALDWELL,
BESS A. MAHAN.